(12) United States Patent
Lin

(10) Patent No.: US 8,370,599 B2
(45) Date of Patent: Feb. 5, 2013

(54) STORAGE SYSTEM AND CONTROLLING SYSTEM AND METHOD THEREOF

(75) Inventor: Wei-Lung Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 873 days.

(21) Appl. No.: 12/503,863

(22) Filed: Jul. 16, 2009

(65) Prior Publication Data

US 2010/0268909 A1 Oct. 21, 2010

(30) Foreign Application Priority Data

Apr. 16, 2009 (CN) .......................... 2009 1 0301602

(51) Int. Cl.
G06F 12/00 (2006.01)
G06F 13/00 (2006.01)
(52) U.S. Cl. ......... 711/173; 711/100; 711/129; 711/154
(58) Field of Classification Search .................. 711/100, 711/129, 154, 173
See application file for complete search history.

(56) References Cited

U.S. PATENT DOCUMENTS

| 6,459,644 | B2 * | 10/2002 | Mizushima et al. | 365/230.01 |
| 7,065,761 | B2 * | 6/2006 | Foster et al. | 718/100 |
| 7,660,948 | B2 * | 2/2010 | Bates et al. | 711/117 |
| 2009/0282210 | A1 * | 11/2009 | Heyrman et al. | 711/173 |

* cited by examiner

*Primary Examiner* — Tuan V. Thai
(74) *Attorney, Agent, or Firm* — Altis Law Group, Inc.

(57) ABSTRACT

A controlling system is used in a storage system. The storage system includes a host and at least one storage device connected to the host in series. The controlling system includes a detecting unit and a partitioning unit. The detecting unit is operable to detect the number of the at least one storage device. The partitioning unit is operable to partition the at least one storage device and generate a partition table and at least one partition information table. The partition table records partition information of the at least one storage device. Each partition information table is stored in a corresponding storage device and records storage information of the corresponding storage device.

9 Claims, 4 Drawing Sheets

STORAGE SYSTEM AND CONTROLLING SYSTEM AND METHOD THEREOF

BACKGROUND

1. Technical Field

The present disclosure relates to storage systems and, particularly, to a storage system capable of extending capacity, a controlling system and a controlling method thereof.

2. Description of Related Art

Flash memory drives are now becoming ubiquitous to store electronic data. Typically, these flash memory drives are plugged into the host with a fixed storage capacity. To increase the storage capacity of the storage system, flash memory drives having larger storage capacities must be used, thereby making the previous smaller storage drives redundant and, thus wasting storage resources.

Therefore, it is desirable to provide a storage system, a controlling system and a controlling method thereof which can overcome the described limitations.

DETAILED DESCRIPTION

Embodiments of the disclosure will now be described in detail with reference to the drawings.

Figure 1:
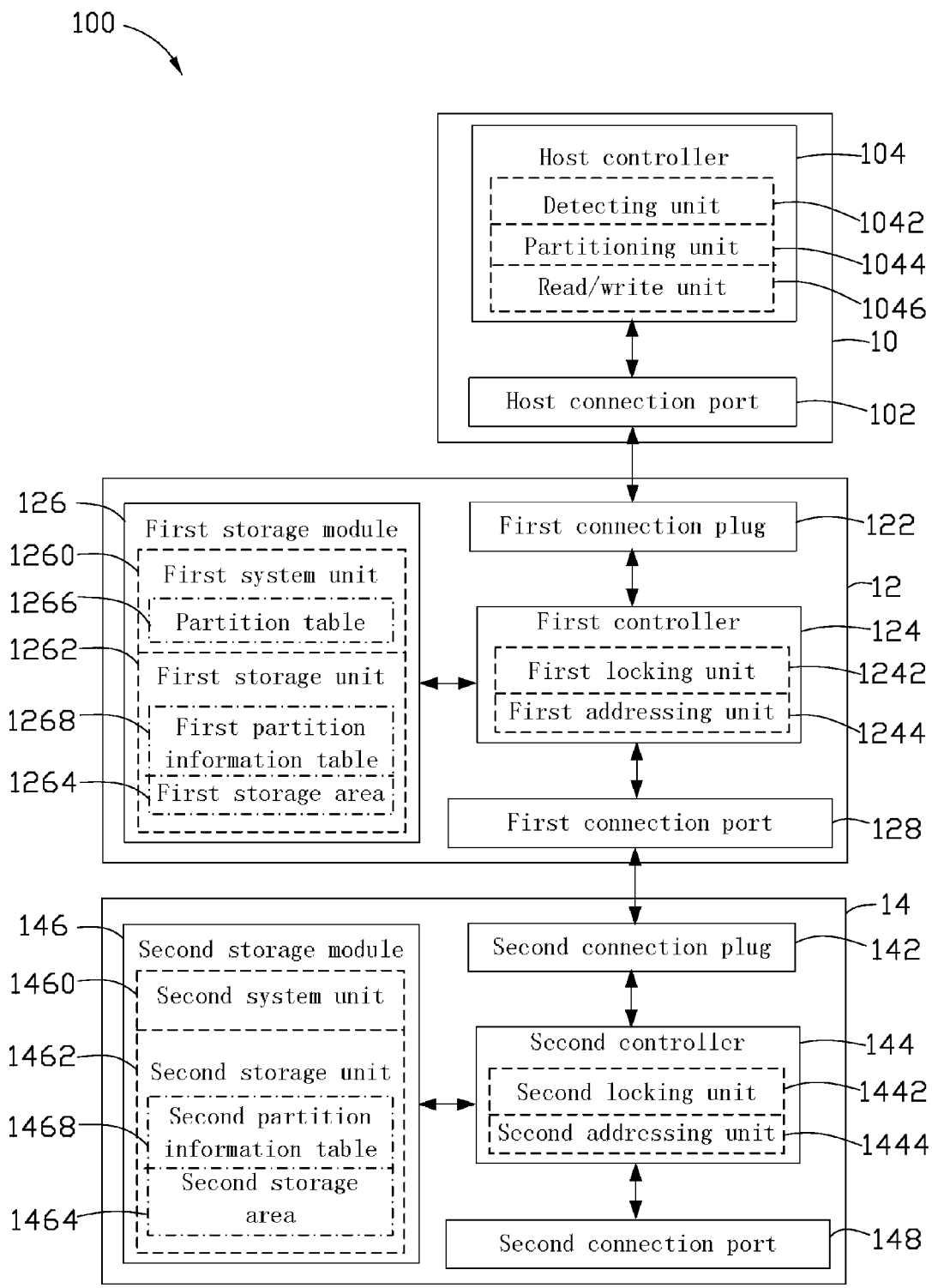
FIG. 1 is a block diagram of a storage system, according to a first exemplary embodiment.

FIG. 1 shows a storage system 100 in accordance with an exemplary embodiment. The storage system 100 includes a host 10, a first storage device 12, and a second storage device 14.

The host 10 includes a host connection port 102 and a host controller 104 connected to the host connection port 102. The host connection port 102 is a universal series bus (USB) connection port. The host controller 104 includes a detecting unit 1042, a partitioning unit 1044, and a read/write unit 1046.

The first storage device 12 includes a first connection plug 122, a first controller 124, a first storage module 126, and a first connection port 128. In this embodiment, the first connection plug 122 is a USB connector, and the first connection port 128 is a USB connection port. The first controller 124 is configured for coordinating the first connection plug 122, the first storage module 126, and the first connection port 128. The first controller 124 includes a first locking unit 1242 and a first addressing unit 1244. The first storage module 126 is a flash memory chip, and includes a first system unit 1260 and a first storage unit 1262. The first storage unit 1262 includes a first storage area 1264. The first storage area 1264 is configured for storing files, such as image files or video files.

The second storage device 14 has the same structure of the first storage device 12, and includes a second connection plug 142, a second controller 144, a second storage module 146, and a second connection port 148. The second controller 144 includes a second locking unit 1442 and a second addressing unit 1444. The second storage module 146 includes a second system unit 1460 and a second storage unit 1462. The second storage unit 1462 includes a second storage area 1464.

Figure 2:
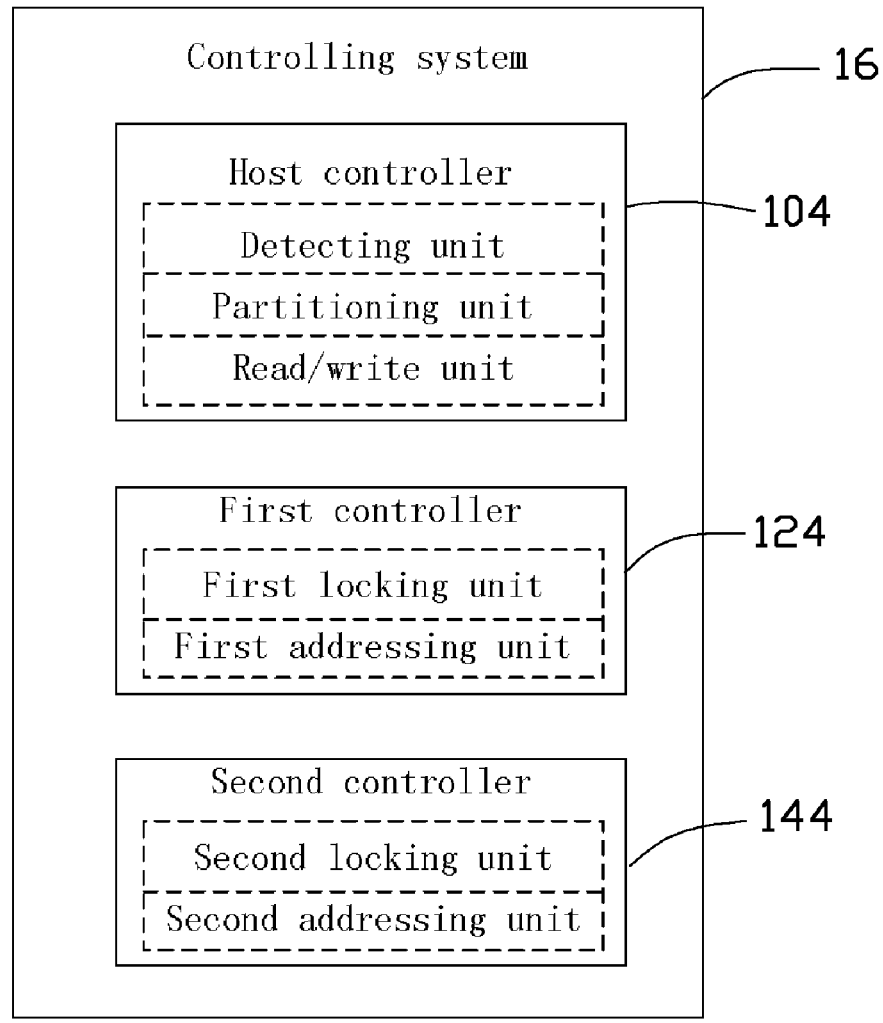
FIG. 2 is a block diagram of a controlling system of the storage system in FIG. 1.

In use, the first connection plug 122 is plugged into the host connection port 102. The second connection plug 142 is plugged into the first connection port 128. The host controller 104, the first and second controllers 124, 144 constitute a controlling system 16 as shown in FIG. 2.

Initially, the detecting unit 1042 detects that the first storage device 12 is connected to the host connection port 102, and that the second storage device 14 is connected to the first connection port 128. If both connections are detected, the partitioning unit 1044 "partitions" the first and second storage devices 12, 14 as two partitions, and generates a partition table 1266 in the first system unit 1260, a first partition information table 1268 in the first storage unit 1262, and a second partition information table 1468 in the second storage unit 1462. The partition table 1266 records partition information such as sizes and physical addresses of the first and second storage modules 126, 146. The first partition information table 1268 records the storage information of the first storage device 12, such as a size of the first storage unit 1262, and physical and corresponding logical addresses of files currently stored in the first storage area 1264. The second partition information table 1468 records the storage information of the second storage device 14, such as a size of the second storage unit 1462, and physical and corresponding logical addresses of files currently stored in the second storage area 1464. The second locking unit 1442 locks the second system unit 1460.

To read (write) a file, the read/write unit 1046 generates a read (write) command and sends the read (write) command to the first controller 124 in response to a user input to the host controller 104. The first addressing unit 1244 analyses the read (write) command to determine a logical address addressed by the read (write) command. If the logical address points to the first storage module 126, the first addressing unit 1244 accesses corresponding storage block(s) in the first storage area 1264 according to the first partition information table 1268. If the logical address points to the second storage module 146, the second addressing unit 1444 communicates with the first addressing unit 1244, and accesses corresponding storage block(s) in the second storage area 1464 according to the second partition information table 1468. Then, the read/write unit 1046 reads (writes) the file stored in the accessed corresponding storage block(s). If the read/write unit 1046 writes to the first or second storage area 1264, 1464, the partitioning unit 1044 updates the first or second partition information table 1268, 1468 correspondingly.

Figure 3:
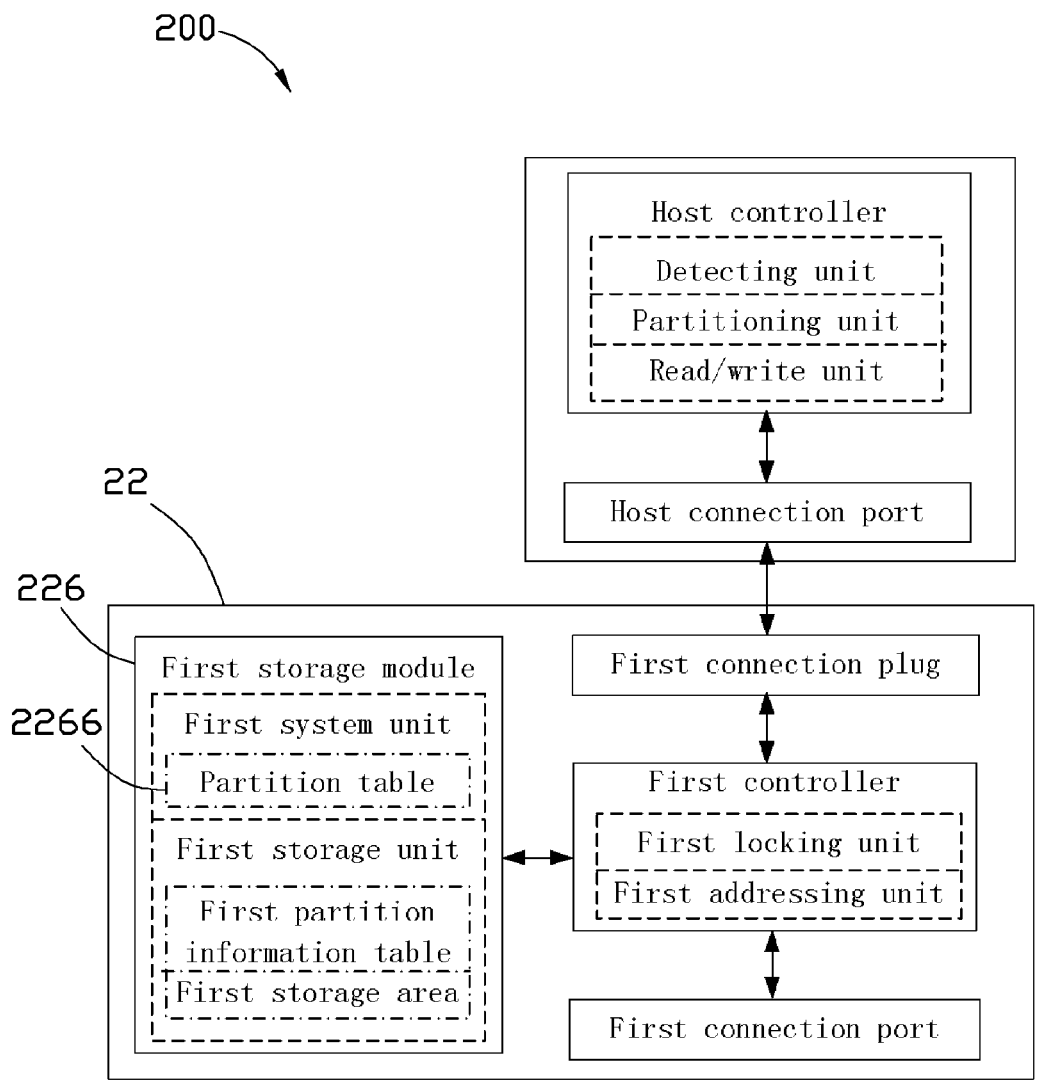
FIG. 3 is a block diagram of a storage system, according to a second exemplary embodiment.

It should be understood that the storage system 100 is not limited to include two storage devices. Alternatively, the storage system 100 may include further more storage devices each having essentially similar structure as the first storage device 12 and these storage devices are connected in series. In an alternative exemplary embodiment, a storage system 200 includes only a first storage device 22 as shown in FIG. 3. A partition table 2266 only records partition information of a first storage module 226.

As compared with current storage systems, the storage system 100 can easily extend its capacity via increasing the storage devices connected to the host 10. Storage devices having little capacities but with essentially similar structure as the first storage device 12 can also be joined in to increase the capacity of the storage system 100, avoiding being abandoned.

Figure 4:
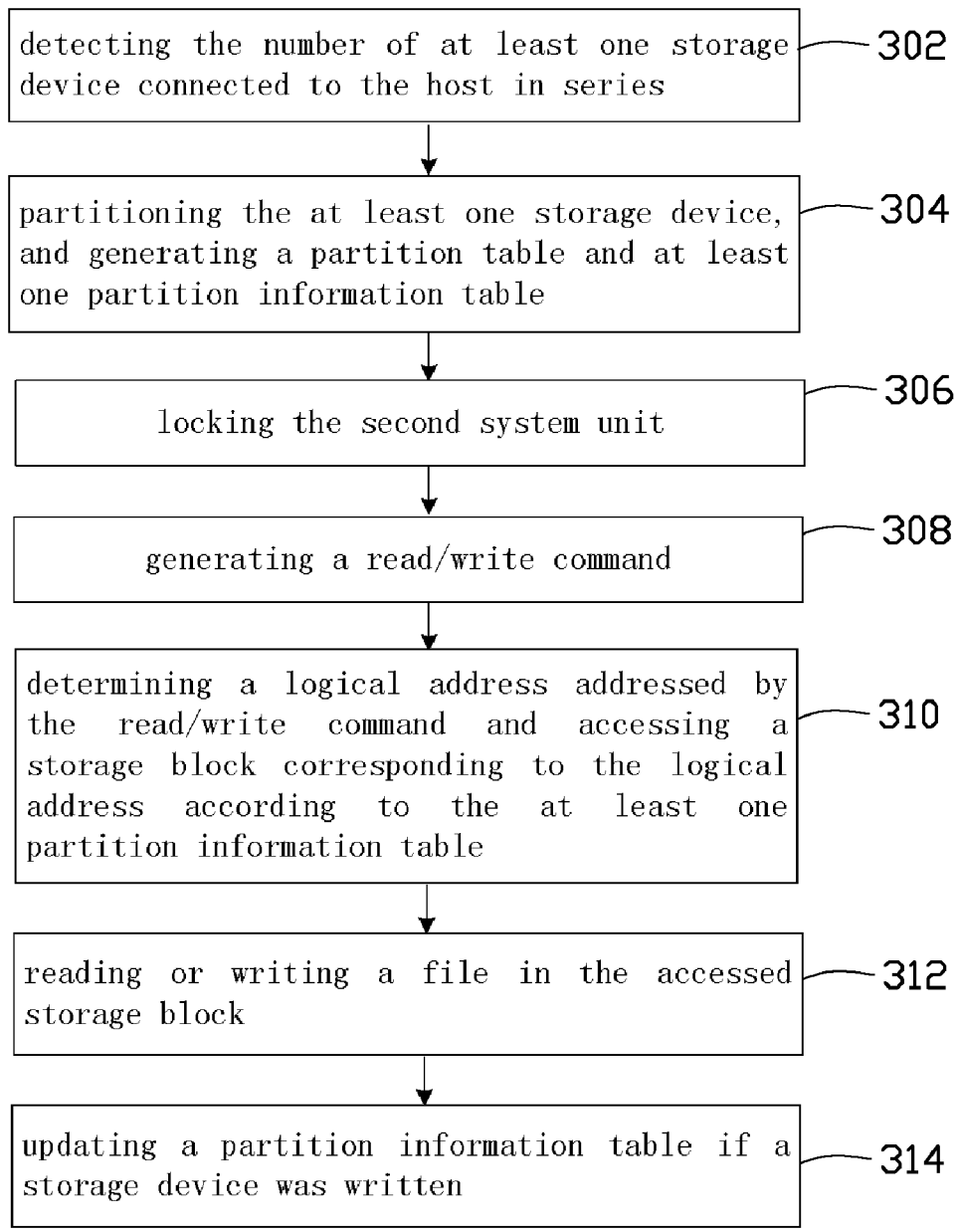
FIG. 4 is a flowchart of a controlling method of a storage system, according to a third exemplary embodiment.

FIG. 4 shows a flowchart of a controlling method which can be exemplarily performed by the storage system 100. In this embodiment, the controlling method includes the following steps 302-314.

In Step 302, how many storage devices are connected to the host 10 is detected. In this embodiment, the detecting unit 1042 detects that the first storage device 12 is connected to the host connection port 102, and that the second storage device 14 is connected to the first connection port 128.

In Step 304, the partitioning unit 1044 partitions the connected storage device(s). In this embodiment, the partitioning unit 1044 partitions the first and second storage devices 12, 14, and generates a partition table 1266 in the first system unit 1260, a first partition information table 1268 in the first storage unit 1262, and a second partition information table 1468 in the second storage unit 1462. The partition table 1266 records partition information such as sizes and physical addresses of the first and second storage modules 126, 146. The first partition information table 1268 records the storage information of the first storage device 12, such as the size of the first storage unit 1262, and physical and corresponding logical addresses of files currently stored in the first storage area 1264. The second partition information table 1468 records the storage information of the second storage device 14, such as the size of the second storage unit 1462, and physical and corresponding logical addresses of files currently stored in the second storage area 1464.

In Step 306, the second locking unit 1442 locks the second system unit 1460.

In Step 308, the read/write unit 1046 generates a read (write) command and sends the read (write) command to the first storage device 12. In this embodiment, the read/write unit 1046 sends the read (write) command to the first controller 124.

In Step 310, the storage block(s) corresponding to the read (write) command is(are) accessed. In this embodiment, the first addressing unit 1244 analyses the read (write) command to determine a logical address addressed by the read (write) command. If the logical address points to the first storage module 126, the first addressing unit 1244 accesses corresponding storage block(s) in the first storage area 1264 according to the first partition information table 1268. If the logical address points to the second storage module 146, the second addressing unit 1444 communicates with the first addressing unit 1244, and accesses corresponding storage block(s) in the second storage area 1464 according to the second partition information table 1468.

In Step 312, the file(s) stored in the accessed storage block (s) is(are) read (written).

In Step 314, if the read/write unit 1046 writes to the first or second storage area 1264, 1464, the partitioning unit 1044 updates the first or second partition information table 1268, 1468 correspondingly.

It is to be understood, however, that even though numerous characteristics and advantages of the present embodiments have been set forth in the foregoing description, together with details of the structures and functions of the embodiments, the disclosure is illustrative only, and changes may be made in details, especially in matters of arrangement of parts within the principles of the invention to the full extent indicated by the broad general meaning of the terms in which the appended claims are expressed.

What is claimed is:

1. A controlling system for using in a storage system, the storage system comprising a host and at least one storage device connected to the host in series, the controlling system comprising:
   a detecting unit operable to detect the number of the at least one storage device; and
   a partitioning unit operable to partition the at least one storage device and generate a partition table and at least one partition information table, the partition table recording partition information of the at least one storage device, each partition information table being stored in a corresponding storage device and recording storage information of the corresponding storage device;
   a read/write unit operable to generate a read/write command; and
   at least one addressing unit each corresponding to a storage device, the at least one addressing unit being operable to determine a logical address addressed by the read/write command and access a storage block corresponding to the logical address in the at least one storage device according to the at least one partition information table.

2. The controlling system as claimed in claim 1, wherein the partition table is stored in a storage device which is directly connected to the host.

3. A storage system comprising:
   a host;
   at least one storage device connected to the host in series; and
   a controlling system comprising:
      a detecting unit operable to detect the number of the at least one storage device; and
      a partitioning unit operable to partition the at least one storage device and generate a partition table and at least one partition information table, the partition table recording partition information of the at least one storage device, each partition information table being stored in a corresponding storage device and recording storage information of the corresponding storage device;
      a read/write unit operable to generate a read/write command; and
      at least one addressing unit each corresponding to a storage device, the at least one addressing unit being operable to determine a logical address addressed by the read/write command and access a storage block corresponding to the logical address in the at least one storage device according to the at least one partition information table.

4. The storage system as claimed in claim 3, wherein the partition table is stored in a storage device which is directly connected to the host.

5. The storage system as claimed in claim 3, wherein the host comprises a host connection port, and each storage device comprises a connection plug, a connection port and a storage module, the connection plug of one storage device being plugged into the host connection port, the connection plugs of other storage devices being correspondingly plugged into the connection port of a front storage device if the storage system comprises more than one storage device.

6. The storage system as claimed in claim 5, wherein each storage module comprises a system unit and a storage unit, the system unit being configured for storing the partition table if the connection plug of the storage device is plugged into the host connection port, the storage unit being configured for storing files and a corresponding partitioning information table.

7. The storage system as claimed in claim 6, wherein the controlling system comprises at least one locking unit if the storage system comprises more than one storage device, and each locking unit is configured for locking the system unit of a corresponding storage device.

8. A controlling method for use in a storage system, the storage system comprising a host and at least one storage device connected to the host in series, the controlling method comprising:

detecting the number of the at least one storage device; and partitioning the at least one storage device, and generating a partition table recording partition information of the at least one storage device and at least one partition information table each recording storage information of a corresponding storage device;

generating a read/write command;

determining a logical address addressed by the read/write command and accessing a storage block corresponding to the logical address in the at least one storage device according to the at least one partition information table; and reading or writing a file in the accessed storage block.

9. The controlling method as claimed in claim 8, further comprising:

updating a partition information table of a corresponding storage device which has been written.

* * * * *